Figure 4:
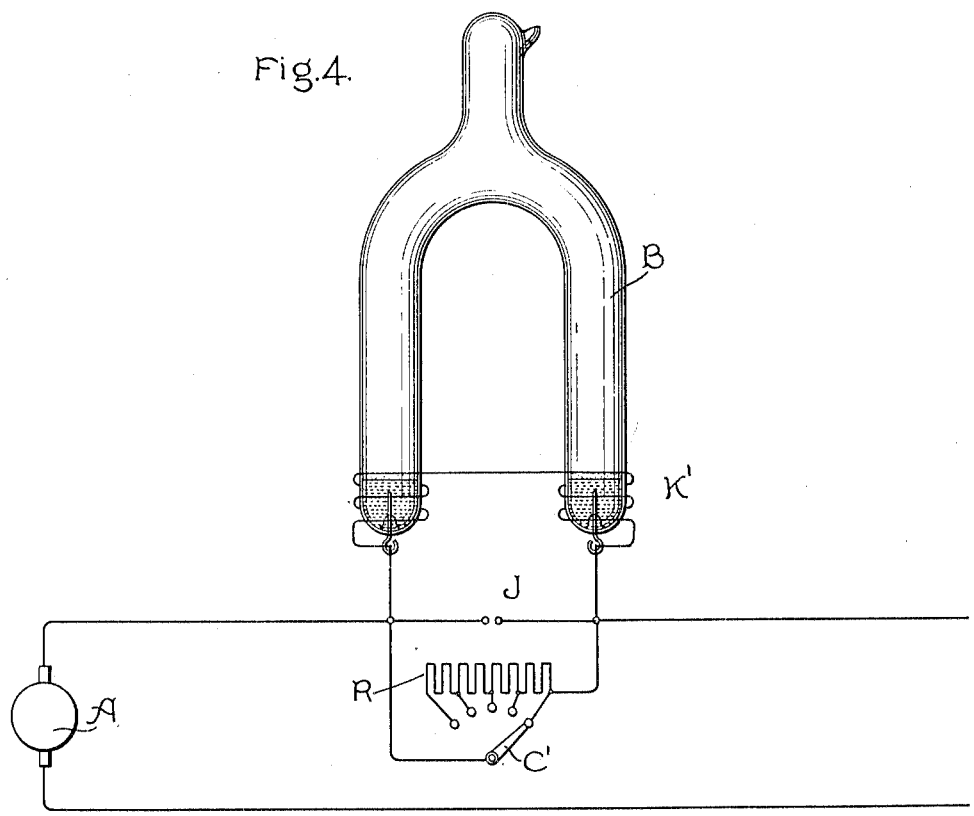

C. P. STEINMETZ.
METHOD OF PRODUCING LIGHT.
APPLICATION FILED MAR. 5, 1900.
1,088,740.
Patented Mar. 3, 1914.
2 SHEETS—SHEET 1.
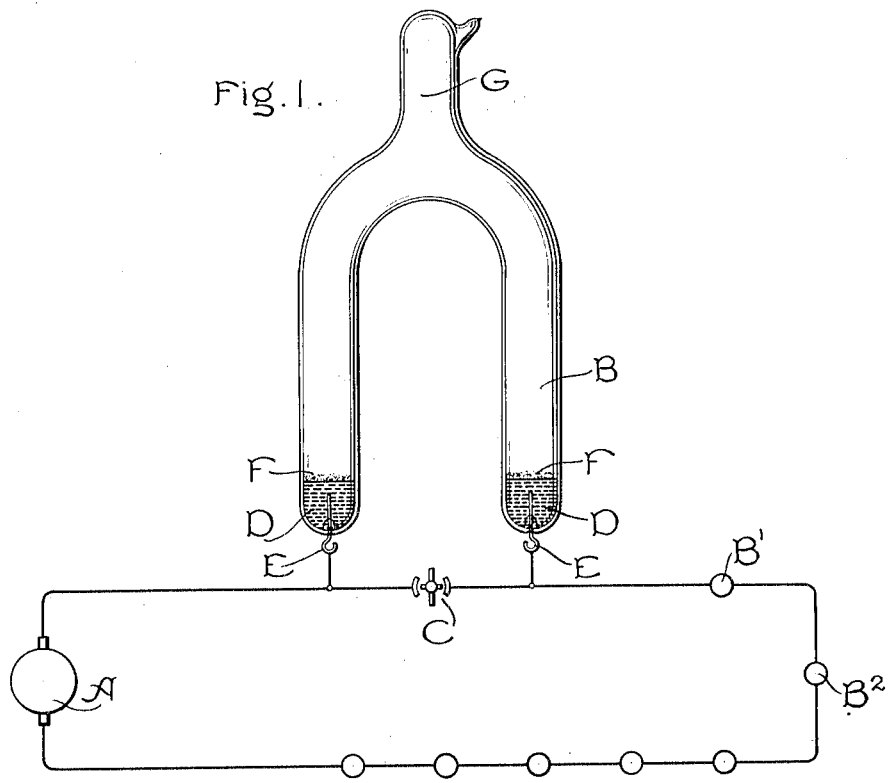
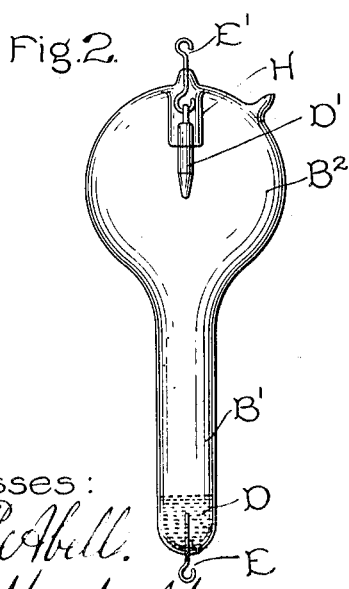
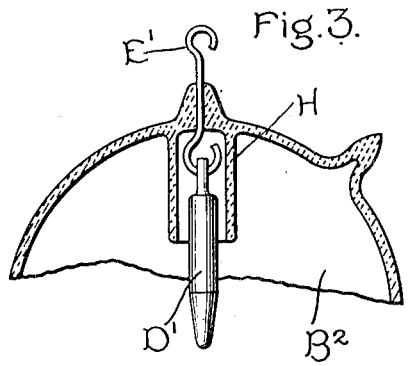
Witnesses:
Lewis B. Abell.
A. F. Macdonald.
Inventor:
Charles P. Steinmetz
by Albert G. Davis
Atty.

C. P. STEINMETZ.
METHOD OF PRODUCING LIGHT.
APPLICATION FILED MAR. 5, 1900.

1,088,740.

Patented Mar. 3, 1914.
2 SHEETS—SHEET 2.

Witnesses:
Lewis P. Abell.
A. F. Macdonald.

Inventor:
Charles P. Steinmetz
by Albert G. Davis
Atty.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

METHOD OF PRODUCING LIGHT.

1,088,740.     Specification of Letters Patent.     Patented Mar. 3, 1914.

Application filed March 5, 1900. Serial No. 7,265.

*To all whom it may concern:*

Be it known that I, CHARLES P. STEINMETZ, a citizen of the United States, residing at Schenectady, in the county of Schenectady and State of New York, have invented certain new and useful Improvements in Methods of Producing Light, of which the following is a specification.

My invention relates to the production of light of any desired color, from electrical energy.

It is my belief that the light from an electric arc, excluding that portion of the light coming direct from the crater or from other incandescent surfaces, is due to a vibration of the ultimate particles of vapor in the arc stream, which vibration is probably caused by the electric stress due to the potential gradient of the arc. It is found that the color of the light, or more broadly speaking, the wave length of the radiant energy derived from an arc, is practically independent of temperature, and dependent principally on the nature of the conducting vapor which forms the arc stream. The vibrations therefore appear to be, as it were, "sympathetic," and may take place very considerably below the temperature of incandescence.

In general, the temperature of an arc is fixed by the nature of the electrode, just as the temperature of any boiling liquid is fixed by the nature of the most volatile component of that liquid. It is common in practice to use electric arcs between carbon electrodes for commercial lighting. In carbon arcs the major portion of the light comes from the craters, so that it is perhaps not strictly correct to speak of these devices as "arc" lamps. This incandescence is the result of the very high temperature of the carbon arc, but the high temperature causes very heavy radiation losses.

The temperature of the carbon arc stream is fixed by the volatilization temperature of carbon, as is the temperature of any true vapor, and this temperature is such that a very large proportion of the energy from a carbon arc is radiated in the form of dark heat waves, so that the carbon arc becomes an extremely inefficient means of converting electric energy into light. I find it highly advantageous in my new method of producing light to avail myself of substances vaporizing at very low temperatures, and by using such substances I am able to greatly reduce the radiation losses, and to correspondingly increase the efficiency.

It is obviously necessary for the maintenance of the arc that the vapors from the electrode should be conductors of electricity, and it is therefore necessary to use as an electrode a substance producing conducting vapors. This requisite is fulfilled by mercury, and further, mercury is a substance vaporizing at very low temperature. Hence it appears that an arc between electrodes, at least one of which is formed of mercury, should be an extremely efficient light-giving arrangement, and this is indeed the fact, but the mercury arc is, unfortunately, of an extremely disagreeable color. It gives a discontinuous spectrum containing the Fraunhoefer lines 4047; 4359; 5461; 5769 and 5790, and some fainter intermediate lines. The sodium line, 5890, sometimes appears faintly, but this is probably due to the action of the glass or the presence of some impurity. It will be seen that all of these lines are either violet, blue or green, and that the spectrum is practically devoid of yellow, orange and red. As a result of this deficiency, red objects appear black or gray when viewed by light from a mercury arc, and human faces acquire a peculiar and disagreeable pallor, so that the light from the mercury arc seems to be utterly unsuited to commercial application.

It is one object of my invention to so modify the light from the mercury arc as to produce a soft, brilliant, white light with very low radiation losses, and with an efficiency rising as high as three to five candle-power per watt; whereas ordinary incandescent lamps, with which my improved lamp may properly be compared, require about three watts per candle-power, while even the carbon arc, which is in many ways unsuited to interior illumination, requires in general about one watt per candle-power. Further, my invention is not necessarily restricted to the production of a pure white light, but I am able to so modify the light of the mercury-arc stream as to cause almost any desired wave length to strongly preponderate, and I may thus produce a colored light, for example red light, at an efficiency hitherto impossible. The ordinary method for producing red light by electricity is to pass the current through a suitable lamp of any ordinary type, and to modify the light from this lamp by passing the light through red glass. It is well known that the action of such red glass is simply to screen out the larger proportion of the violet, blue, green and yellow rays, and to allow only the red rays to pass. This, obviously, takes away a very large percentage of the radiant energy generated, and greatly reduces the efficiency of an already inefficient lamp. By virtue of my improvements it is possible to generate once for all red light, so that a very large proportion of the radiant energy actually issues from the lamp in the form of red rays, and the same principle may be applied to the production of light of any desired color. Nor is my invention necessarily restricted to the use of mercury, as certain other substances fulfil fairly well the conditions above set forth, though I have thus far found mercury best adapted for practical use.

My improved method of modifying the color of an electric arc consists, broadly speaking, in introducing conducting vapors of substances whose arc spectra have the desired wave length. This process, however, is not as simple in practice as the above statement, for it seems essential that electric arcs, particularly from mercury, should be inclosed in glass tubes or vessels. I will discuss below the various methods of starting the arc; but one method of starting is to have an initial high voltage in combination with a lamp exhausted to a high vacuum. Obviously, for such a lamp as this, glass is the only suitable material, and even in lamps which are started much as is the ordinary carbon arc, it is highly preferable to surround the arc by a glass-inclosing chamber, both to prevent unsteadiness and to prevent the poisonous vapor of mercury from escaping into the surrounding space. Now I find that all of the substances which might naturally be introduced to the mercury arc to modify its color, and particularly lithium, sodium, potassium and rubidium, violently attack this glass envelop, or any other transparent or translucent envelop known to me, and within a few minutes or at most a few hours destroy its transparency by causing a black deposit or incrustation in the interior.

It is therefore, another important feature of my invention to artificially maintain the translucency of the envelop in which the arc exists, and though I point out in this specification one particular method, which in practice I have found most advantageous for this purpose, and though I intend by the claims attached to this specification to claim the method both broadly and specifically, nevertheless it should be understood that in many aspects my invention is not limited thereto, but I have devised other means for accomplishing this beneficial result, which means, though included under the broad claims of the present application, are, nevertheless, to be specifically covered by other and later cases.

The particular method of this case consists in adding the modifying conducting vapors in a chemically inert condition, and, preferably, in what is known as the "ionized" state, that is to say, as free atoms coexisting with free atoms of some other substance combining with the conducting vapors at ordinary temperatures, but at complete or partial dissociation at the temperature of the mercury arc.

I find that the elements of the halogen class, that is to say: iodin, bromin, chlorin and fluorin, are useful in the order named; that is to say, iodin is the best, since the iodids dissociate at a comparatively low temperature. Thus, for example, if a certain shade of red is desired, I introduce into the arc-stream a large quantity of lithium vapors in the ionized condition, by covering the surface of the mercury with anhydrous lithium iodid. If, again, I wish to produce pure white light I use a comparatively small quantity of a mixture of the iodids of lithium and sodium or even of lithium, sodium and potassium. If I wish to produce a bright blue light I use the iodid of indium; if I wish to produce a dark green light I use iodid of thallium; a yellow light is produced by iodid of sodium, and another shade of red is produced by iodid of potassium and rubidium. When producing these highly-colored lights it seems that the mercury-arc stream act principally as a carrier of the vapors of the substances introduced, while when producing white light the mercury arc will itself give the violet, blue and green, and the rays of longer wave length may be produced by the substances artificially introduced. It is best in any case to cause the powdered iodids, or speaking more generally the color-modifying substance, to cover completely the mercury electrode or electrodes, in order to prevent the arc from striking uncovered mercury, which would cause its color to vary. But I find that it sometimes happens that an electrode covered in this way gives a light in which the spectrum lines of the color-modifying substances are too prominent.

It is another object of my invention to overcome this difficulty, and this I am able to do by diluting the color-modifying substance by adding thereto a relatively inert substance, and by preference one which does not dissociate at the temperature used. Calcium fluorid works well, as it is inert in the presence of the halogen salts used as color-modifiers, and so stable that it does not dissociate at the temperature of the mercury arc. By varying the proportions of active coloring substances and inactive diluting substances any shade may be produced, and candle-light, incandescent-electric light, etc., may successfully be imitated.

I have then, in compliance with the statutes, briefly indicated the nature and object of my invention. I will now proceed to describe the methods and apparatus which I use for carrying it out in practice, with reference to the accompanying drawings, and will, in the claims attached to this specification, indicate the scope of my invention in its several aspects.

Figure 5:
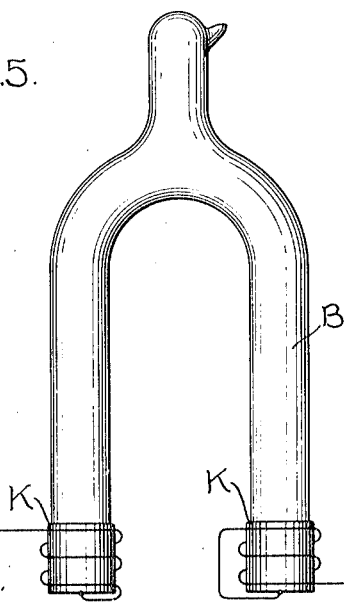

In the drawings attached to this specification, Figure 1 is a view of a lamp constructed in accordance with my present invention, connected in a series system; Fig. 2 is a view of a modified form of lamp; Fig. 3 is an enlarged detail in cross section of the form shown in Fig. 2; Fig. 4 shows an improved method of connecting into the circuit the lamp of Fig. 1; Fig. 5 shows a still further modification.

In Fig. 1, A is a generator, which may be supposed to typify any source of constant electric current, whether alternating or direct, and B, B', etc., are lamps connected in circuit in series. C is a switch shunting the lamp B, and similar switches will be used to shunt each lamp of the system. The lamp B is shown as consisting of an inverted U tube with mercury electrodes D D and platinum terminals E E. The surface of the mercury is covered with a thin layer, F, of iodid of some material or materials giving conducting vapors, in accordance with the general principle above set forth, and in the particular lamp shown we may suppose that this layer is composed of a mixture of the iodids of lithium and sodium with or without the addition of diluent substances such as fluorid of calcium. These iodids are introduced into the tube, and care must be taken to have them perfectly anhydrous, since the presence of moisture is extremely harmful. The tube is then exhausted in the manner usual with ordinary incandescent lamps, but I find it advantageous to replace the residual air by hydrogen, since an atmosphere of rarefied hydrogen requires a very low initial voltage as compared with the atmosphere of rarefied air. With helium or argon, where either of these gases can be obtained, the starting voltage may be still further reduced. If now the tube be sealed off and the switch C be thrown to the position shown, and particularly if the mercury electrodes D D be artificially heated, a luminous arc or discharge will strike from one electrode to the other, and the whole tube will seem to be filled with a white, soft light of considerable intensity. When the light is once fairly started the voltage across the lamp falls considerably. The action appears to be somewhat as follows: A true mercury arc exists between the terminals D D, that is to say, the current flows from one terminal to the other through a path of mercury vapor, and this mercury vapor, under the influence of the electric current, gives a brilliant light containing violet, blue and green rays, at a temperature far below the temperature of incandescence, and with an efficiency much greater than can be obtained from any known incandescent light. The mercury is evaporated from moment to moment, and during the operation of the lamp condenses in the condensing chamber G, whence it trickles back to the electrodes. The arc stream is thus maintained as a continuous body of mercury vapor. The arc, which is more definite at its ends than at any other point, plays back and forth over the surface of the mercury electrodes, and continuously vaporizes small quantities of the halogen salts of alkali metals. We have in this particular case assumed these salts to be iodids of lithium and sodium. These salts are evaporated as above stated, and are carried into the arc stream. At this temperature they partially dissociate, so that free atoms of lithium and sodium exist in the arc stream, at least as far as their light-giving function is concerned, and the arc shows the characteristic spectra of lithium and sodium. These substances, however, are not chemically free, but are in very intimate relation with the iodin atoms from which they have been separated, and are probably continuously combining, dissociating and recombining in the arc stream. Their chemical affinities are in each case, if not satisfied, yet capable of being satisfied, and they do not attack the glass.

I am thus able to produce at low cost and with high efficiency a light which may be pure white, or which may, on the other hand, be of any desired color. The particular lamp shown has the disadvantage that it is adapted for a series circuit, and also that it requires to be started by bringing the mercury nearly to the point of boiling by artificial means. This particular lamp, however, is typical of my main invention, though other types of lamps, to be hereinafter described, avoid in a greater or less degree the difficulties above mentioned.

I have found that it is not necessary that both electrodes should be formed of mercury or other substance vaporizable at low temperatures, for the reason that if one of the electrodes is of such a substance, the evaporation from this electrode will tend to reduce the temperature of the arc to an efficient point. I, therefore, am able to form one electrode of iron, or other conductor, as carbon, etc., though when direct current is used it is preferable to make the refractory terminal the cooler and the mercury or volatile terminal the hotter electrode, in order to insure the maintenance of the proper temperature in the globe. The negative electrode is the cooler at atmospheric pressure and at low vacua, but the relation may sometimes reverse at higher vacua.

In Fig. 2 I show another form of lamp which I have found to operate well. This lamp is composed of a single vertical tube B′, expanding at its upper portion to a globe B². The lower electrode D is of mercury as before, and should be provided with color-modifying substances as above explained. This electrode is connected through the terminal E to one side of the system, or to one terminal of the generator. The upper electrode D′ is formed of metal, as iron, and is conductively supported from the terminal E′. I have found in the use of lamps of this type that the arc has a tendency at high vacua to run up the side of the electrode D′, and to fuse the glass at or near the point where the terminal passes through. I attribute this phenomenon to the fact that the transition resistance between the vacuum and the electrode is larger than the resistance of the vacuum. Whatever the cause may be, the phenomenon is highly objectionable, for the reason that it tends to melt and discolor the glass. I find in practice that the trouble can be overcome by surrounding the electrode D′, for a part of its length, by a glass tube H, which is fused directly to, or forms part of, the lamp itself. It is difficult for the arc to exist in the narrow space between the sides of the tube and the electrode, so that the arc naturally tends to strike the electrode at or near the lower portion of the tube, at a point where the electrode is out of contact with the glass.

Fig. 4 shows the lamp of Fig. 1 with an improved device for connecting it in circuit. In this figure, A is a constant-current generator. B is the lamp and C′ is a switch. The resistance R is shunted around the lamp and the amount of this resistance in circuit is controlled by the resistance of the switch C′. In the position shown in the drawings current passes freely from the generator through the switch around the lamp. When the switch is moved to the left one point, a small portion of the resistance R is connected in series in the constant-current circuit and the lamp is shunted around the drop of potential caused by this resistance. For example, in a ten-ampere circuit, if the first step of resistance is 5 ohms, the drop of potential across the lamp will be about 50 volts, supposing that the lamp itself takes no current. It is thus evident that a motion of the switch handle to the left will raise the voltage across the lamp until finally an arc is struck and that in the meantime the constant-current circuit will not be interrupted, provided that the switch arm C′ is constructed as such switches usually are constructed, with a terminal wider than the distance between contact segments. When the lamp is heated into condition of stability, the arm C′ can be thrown still farther to the left, which will open-circuit the resistance R and cause all of the current to pass through the lamp. I prefer to place lightning-arrester spark gaps or film cut-outs J around each lamp in order that if for any reason the arc breaks, the constant-current circuit may not be interrupted.

In practice I find that the arc tends to flicker unless the mercury is maintained at its boiling point, and with some designs of tube it is not possible to accomplish this by the heat developed by the arc itself. I, therefore, find it advisable in some cases to artificially generate heat at each electrode. The arrangement for this purpose is shown at Fig. 5, in which the lower ends of the tube B are surrounded by soft iron caps K K, and around each of these caps is coiled a number of turns of the wire which carries the current to the lamp. If the current is alternating it will tend to set up eddy currents in the iron caps and these caps will thus become heated and tend to maintain the mercury at the proper temperature. If the current is direct it is necessary to use more wire and to place it in heat-conductive relation to the cap. The heating coils may be placed in series with the lamps, as shown in Fig. 5, or they may be placed in multiple as shown in Fig. 4 at K′. The advantage of the latter arrangement on constant-current circuits is to increase the effect of the heating coils at starting, when they are most needed.

What I claim as new and desire to secure by Letters Patent of the United States is:

1. The method which consists in producing an arc in a transparent chamber between terminals, one of which is vaporizable at low temperature, coloring the arc by the addition of a chemically active metallic substance, and protecting the inclosing chamber from injury by neutralizing the chemical activity of the metallic substance.

2. The method of modifying the color of an arc light without destroying the envelop in which the light exists, which consists in introducing into the arc a substance capable of giving off chemically active metallic vapors, and neutralizing to the desired extent the chemical activity of such substance.

3. The method of producing light from electricity, which consists in maintaining in a suitable envelop, an arc in a vapor of a substance vaporizing at a temperature below the temperature of incandescence, and modifying the color of the light therefrom by the addition of color modifying vapors of a metallic salt.

4. The method of producing light, which consists in generating an arc in a transparent or translucent envelop, modifying the color of the arc by introducing metallic vapors, and artificially maintaining the translucency of the envelop.

5. The method which consists of producing an arc between terminals one of which is vaporizable at low temperature, surrounding such arc by an inclosing chamber, and modifying the color of the light by the addition of anhydrous iodids of lithium and sodium.

6. The method which consists of producing an arc between terminals one of which is vaporizable at low temperature, surrounding such arc by an inclosing chamber, and modifying the color of the light by the addition of anhydrous iodids of lithium and sodium and a neutral diluent.

7. The method which consists of producing an arc between terminals one of which is vaporizable at low temperature, surrounding such arc by an inclosing chamber, and modifying the color of the light by the addition of anhydrous metallic halogen salt.

8. The method which consists of producing an arc between terminals one of which is vaporizable at low temperature, surrounding such arc by an inclosing chamber, modifying the color of the light by the addition of anhydrous metallic halogen salt, and regulating the amount of such modification by the addition of a diluent.

9. The method which consists of producing an arc between terminals one of which is vaporizable at low temperature, surrounding such arc by an inclosing chamber, modifying the color of the light by the addition of anhydrous metallic halogen compound, and regulating the amount of such modification by the addition of a diluent containing a stable halogen salt.

10. The method which consists of producing light by passing electric current through vapors in a transparent or translucent envelop, which vapors have an affinity for said envelop, and artificially protecting the envelop from injury due to the action of said vapors.

11. The method of producing light from electricity, which consists of producing an arc from a terminal vaporizable at low temperatures, and continuously causing electric current to impart heat to said terminal in addition to the heat imparted by the arc.

12. The method of producing light which consists in producing an arc from a terminal capable of volatilization at low temperature, in a rarefied atmosphere of gas of lower dielectric strength than air, and modifying the color of the arc by adding luminous conducting vapors.

In witness whereof I have hereunto set my hand this 2nd day of March, 1900.

CHARLES P. STEINMETZ.

Witnesses:
 BENJAMIN B. HULL,
 MABEL H. EMERSON.